United States Patent [19]

Burgdorf et al.

[11] Patent Number: 5,213,399
[45] Date of Patent: May 25, 1993

[54] ANTI-LOCK HYDRAULIC BRAKE SYSTEM

[76] Inventors: Jochen Burgdorf, Neugasse 11, 6050 Offenbach-Rumpenheim, Fed. Rep. of Germany; Eugen Haselwanter, 1925 Somerset Blvd. 2, Troy, Mich.

[21] Appl. No.: 689,231

[22] PCT Filed: Sep. 8, 1990

[86] PCT No.: PCT/EP90/01521

§ 371 Date: Jun. 12, 1991

§ 102(e) Date: Jun. 21, 1991

[87] PCT Pub. No.: WO91/05689

PCT Pub. Date: May 2, 1991

[30] Foreign Application Priority Data

Oct. 17, 1989 [DE] Fed. Rep. of Germany ....... 3934624

[51] Int. Cl.$^5$ .......................... B60T 8/32; B60T 8/48; B60T 8/42
[52] U.S. Cl. .............. 303/115.4; 303/116.2; 303/119.1; 303/901
[58] Field of Search ............ 303/116 SP, 115 PP, 303/116 R, 110, 113 TR, 113 R, 115 R, 115 FM, 116 WP, 116 PC, 91, DIG. 6, 100, 10-12, DIG. 5, 115.4, 116.2, 119.1, 901, 115.5, 115.6, 116.1, 116.3, 116.4, 113.1

[56] References Cited

U.S. PATENT DOCUMENTS 3,532,391 10/1970 Klein ......................... 303/116 R
4,453,782 6/1984 Arikawa et al. ................ 303/116 R
4,618,189 10/1986 Nakanishi et al. ............ 303/115 PP
4,703,979 11/1987 Nakanishi et al. ............. 303/116 R
5,094,511 3/1992 Becker et al. ............. 303/115 PP X

FOREIGN PATENT DOCUMENTS 3438646 5/1985 Fed. Rep. of Germany.
3603533 8/1986 Fed. Rep. of Germany.
58-4658 1/1983 Japan.
62-255265 11/1987 Japan.
63-162358 7/1988 Japan.
64-9057 1/1989 Japan.

Primary Examiner—Douglas C. Butler
Attorney, Agent, or Firm—Robert P. Seitter; J. Gordon Lewis

[57] ABSTRACT

A brake system is presented wherein a pump receives the pressure fluid that is discharged out of the wheel brakes during a control action and supplies it into a high-pressure accumulator. Further, there is provision of a separating valve which closes the brake line during a brake slip control action. The separating valve is actuated mechanically, and namely by the accumulator piston of the high-pressure accumulator. The advantage thereof is that the force of the greatly biased accumulator spring is available for cracking the separating valve open. It is thus ensured in any case that the separating valve is re-opened after a slip-controlled braking operation and renewed braking of the vehicle is possible.

2 Claims, 2 Drawing Sheets

ANTI-LOCK HYDRAULIC BRAKE SYSTEM

TECHNICAL FIELD

The present invention relates to an anti-lock hydraulic brake system.

BACKGROUND OF THE INVENTION

A like brake system is described in DE-OS 36 03 533. The separating valve is operated hydraulically, a first surface of the valve member being loaded by the pressure in the accumulator, while a second surface of the valve member is acted upon by the pressure in the wheel brake. A weak resetting spring keeps the valve in abutment on a stop, the valve passage being open.

During a braking pressure control action, the pump delivers fluid into the high-pressure accumulator, the pressure of which accumulator moves the valve member in opposition to the effect of the weak spring to bear against a valve seat, whereby the brake line is closed. After a pressure control action, the accumulator pressure is reduced so that the valve member will be reset by the action of the weak spring.

The separating valve serves to accomplish hydraulic isolation of the master cylinder during a control action, thereby preventing the brake pedal from being depressed any further, not even when increased pedal force is applied. Furthermore, no pressure fluctuations due to control may occur in the master brake cylinder which would cause vibrating of the pedal. However, for obtaining such a "quiet" pedal one has to put up with the shortcoming that there is the risk that the separating valve will not switch over after a braking pressure control action and that the brake line remains closed as a result. The consequence of this would be that the vehicle can no longer be slowed down sufficiently. Yet the resetting spring in the brake system according to the cited publication cannot be strengthened to any desired extent, because then it be assured that the separating valve will close during a control action.

SUMMARY OF THE INVENTION

Therefore, the present invention is directed to the object of improving a brake system according to the cited publication such as to ensure reliable re-opening of the separating valve after a control action.

This object is achieved by the separating valve being opened mechanically by the accumulator piston which is applied by a strong biassed spring. The great spring force ensures in any case that even in the event of impeded motion of the accumulator piston the latter will always re-assume its initial position after a control action, whereby the separating valve will be opened reliably. Hereinbelow, the present invention shall be explained in more detail by way of two embodiments.

DETAILED DESCRIPTION OF THE INVENTION

Figure 1:
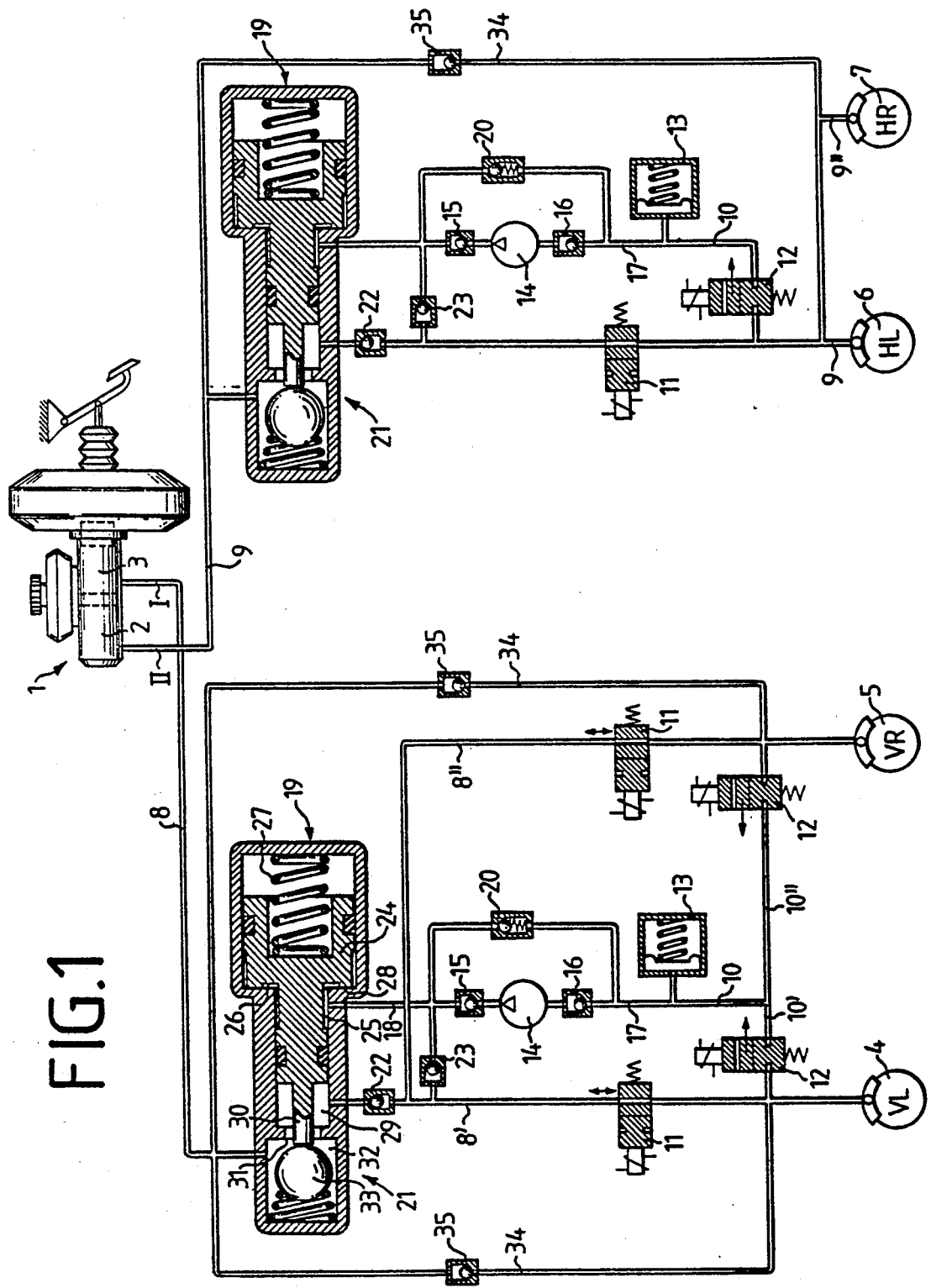
FIG. 1 illustrates a first embodiment of an anti-lock hydraulic brake system constructed in accordance with the present invention.

Referring to the drawings, a brake system, constructed in accordance with the present invention, is composed of a tandem master brake cylinder 1 with two working chambers 2 and 3 which are isolated from each other by means of a floating piston. The working chambers 2 and 3 are pressurized by operation of the symbolically illustrated pedal. Allocated to each working chamber 2 and 3 is a brake circuit I, II, brake circuit I comprising the wheel brakes of the front wheels 4, 5 (VL for the front left wheel and VR for the front right wheel) and brake circuit II comprising the wheel brakes 6, 7 of the rear wheels (HL for the rear left wheel and HR for the rear right wheel). Wheel brakes 4, 5 are in communication with the working chamber 3 via a branching brake line 8 (branch lines 8', 8"). Wheel brakes 6, 7 are in communication with the working chamber 2 via a branching brake line 9 (branch lines 9', 9"). Inserted into each branch line 8', 8" is an electromagnetic inlet valve 11 which is open in its initial position. Another inlet valve 11 is interposed into the brake line 9. Associated with each brake circuit is a low-pressure accumulator 13 which is in communication with the wheel brakes via a branching return line 10 (branch lines 10', 10"). An outlet valve 12 is inserted into each branch line 10', 10" to the wheel brakes 4, 5 and is operated electromagnetically and is closed in its initial position. The return line 10 of the rear-wheel brakes 6, 7 likewise contains an outlet valve 12 which is operated electromagnetically and is closed in its initial position. The inlet valves 11 and outlet valves 12 are furnished with switch signals by a non-illustrated electronic control unit which records the rotational behavior of the wheels by means of sensors and which generates the switch signals according to a control algorithm. In order to decrease the pressure in the wheel brakes, pressure fluid is discharged via the outlet valve into the low-pressure accumulator 13. In order to increase the pressure in the wheel brakes, pressure fluid is delivered to the wheel brakes via the inlet valve 11. In the present embodiment, the pressure in the wheel brakes of the front wheels is controlled individually, while a joint control is provided for the rear-wheel brakes. Each wheel brake and/or wheel brake group is in direct connection with the respectively associated working chamber 2, 3 via a relief line 34 containing a non-return valve 35. The non-return valve 35 opens towards the master brake cylinder. The system further includes a pump 14 with a pressure valve 15 and a suction valve 16. The pump 14 is connected at its suction side to the suction line 17 leading to the low-pressure accumulator 13. The pressure side of the pump leads via a pressure line 18 to a high-pressure accumulator 19. Connected in parallel to the pump 14 is a pressure-relief valve 20 which allows pressure fluid to propagate from the pressure side of the pump to its suction side in the presence of excessively high pressure in the high-pressure accumulator 19.

Each of the brake lines 8 and 9 leads to a separating valve 21 which is arranged between the respective working chamber 2, 3 and the inlet valves 11. Furthermore, the pressure side of the pump communicates via a first non-return valve 23 with the brake line between the separating valve 21 and the inlet valve 11. The non-return valve 23 opens towards the brake line. A second non-return valve 22 in each brake line 8 and 9, respectively, is arranged between the separating valve 21 and the junction of the pressure side of the pump into the brake lines. The second non-return valve 22 closes towards the separating valve 21. The accumulator is composed of a stepped piston 24 which is sealingly guided in a correspondingly stepped bore 25. The annular chamber 26 serves as an accumulator chamber. It is connected to the pressure side of the pump 14.

A strong spring 27 is supported on the stepped piston 24 in such a fashion that the step of the stepped piston 24 bears against the corresponding step of the bore 25. The spring 27 is under bias.

The separating valve is composed of an inlet chamber 32 and an outlet chamber 29 which are interconnected by a bore forming the valve seat 31. The outlet chamber 29 is confined by the smaller step of the stepped piston 24. A tappet 30 which is shaped at the smaller step of the stepped piston 24 projects through the bore and cooperates with the valve ball 33 which is arranged in the inlet chamber 32. When the stepped piston 24 is in its basic position shown, tappet 30 abuts on the valve ball 33 and keeps it at a distance from the valve seat 31. Hence, there is free passage between the master brake cylinder 1 and the wheel brakes. When pump 14 delivers pressure fluid into the annular chamber 25, the stepped piston 24 moves to the right as shown in the drawing in opposition to the force of the spring 27. As a result, the tappet 30 is withdrawn so that the valve ball 33 is able to move into abutment on the valve seat 31. The brake line 8 and/or 9 is closed. As mentioned above, spring 27 is subjected to great bias so that high pressure will develop in the annular chamber 26 as soon as the stepped piston 24 moves away from the stop 28, the pressure ranging between 150 and 200 bar. The maximum absorption capacity of the high-pressure accumulator amounts roughly to 3 to 4 cubic centimeters. The system illustrated in FIG. 1 operates according to the following principle.

The brake line is open in the initial position. The strong accumulator spring 27 keeps the stepped piston 24 in abutment on stop 28 so that the tappet 30 keeps the valve ball 33 spaced from the valve seat 31.

The inlet valves 11 are opened, the outlet valves 12 are closed.

When the pedal is operated, pressure fluid is displaced out of the working chambers 2 and 3 to the connected wheel brakes 4, 5, 6, 7. The pressure fluid flows via the open separating valve 21, the non-return valve 22 and the open inlet valve 11 to the wheel brake. Pressure develops in the brake circuits and hence in the wheel brakes which corresponds to the pedal force.

When the brake is released, the pressure fluid flows out of the wheel brakes 4, 5, 6, 7 via the relief line 34 containing the non-return valve 35 back into the master brake cylinder 1.

The rotational behavior of the wheels is constantly monitored by means of sensors, the sensor signals being generated by an electronic analyzing unit (not shown) which, in turn, generates switch signals for the inlet valves 11 and outlet valves 12 as well as for the pump drive.

When the tendency of any one of the wheels to lock is detected by way of the electronic analyzing unit, the system will switch into the anti-lock mode.

In this mode, the inlet valve 11 will be closed and the outlet valve 12 will be opened. Thus, pressure fluid flows out of the brake of the imminently locking wheel into the low-pressure accumulator 13. Since the drive of pump 14 has been activated at the same time, the pressure fluid continues to be supplied into the accumulator chamber 26 of the high-pressure accumulator 19. As a result, the stepped piston 24 moves to the right in opposition to the force of the accumulator spring 27, whereby—because of the bias of spring 27—a considerable amount of pressure will develop instantaneously which ranges between 150 and 200 bar depending on the dimensioning of the brake system. Movement of the stepped piston 24 causes the tappet 30 to release the valve ball 30 so that the latter moves to sit on the valve seat 31. Separating valve 21 closes.

In the meantime, the pressure decrease in the wheel brake enabled the associated wheel to sufficiently re-accelerate. Now the inlet valve 11 will be opened and the outlet valve 12 will be closed for renewed pressure build-up. Pressure fluid flows out of the accumulator chamber 26 via the non-return valve 23 and the now open inlet valve 11 to the wheel brake.

By successively opening and closing the inlet valves 11 and outlet valves 12, an optimal slip value can be adjusted on the wheel by adapting the pressure in the wheel brake to the forces which are transmissible between tires and road surface. Pressure fluid is always supplied to the accumulator 19 and discharged therefrom again during a like control action. However, there will always remain a small residual quantity which is sufficient to keep the separating valve 21 closed. Therefore, the master brake cylinder 1 is uncoupled from the wheel brakes and hydraulically isolated during a control action so that the pedal stays in that position which it had adopted upon the commencement of the brake slip control action.

However, if the pedal force is decreased so much that the pertinent pressure in the master brake cylinder 1 becomes less than the pressure adjusted in a wheel brake, pressure balance will be effected via the non-return valve 35. Thus, the maximum pressure in the wheel brake continues to be determined by way of the pedal force. The pump drive will be interrupted on termination of a slip-controlled braking operation so that no new pressure fluid is introduced into the accumulator 19. The accumulator chamber 26 exhausts via the non-return valve 23, the open inlet valve 11 and the non-return valve 35 into the unpressurized master brake cylinder. The spring 27 moves the stepped piston 24 to the left, the separating valve 21 being opened as a result.

It is the function of the pressure-relief valve 20 to limit the pressure on the pressure side of the pump and thus in the accumulator. When the limit pressure is reached, the valve will open so that now part of the quantity of pressure fluid is constantly circulated by the pump and/or is kept in store in the low-pressure accumulator 13.

According to FIG. 1, the wheel brakes of the front wheels and the wheel brakes of the rear wheels form one brake circuit each, the difference being that the wheel brakes of the front wheels are controlled individually, while a joint control is effected on the wheel brakes of the rear axle. In all other respects, the brake circuits are of identical design and each comprise a low-pressure accumulator 13, a pump 14, a high-pressure accumulator 19 as well as a separating valve.

Figure 2:
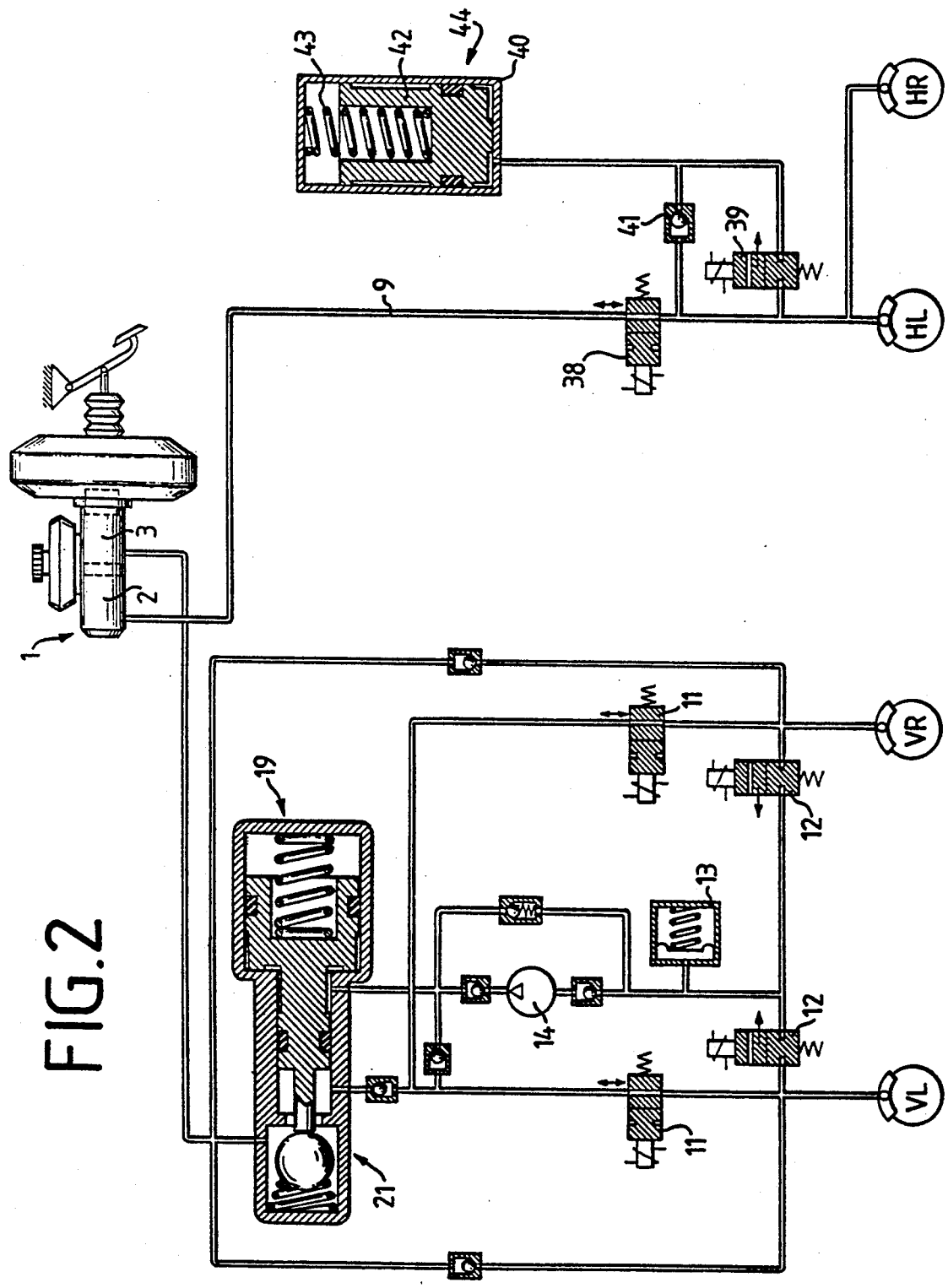
FIG. 2 illustrates a second embodiment of an anti-lock hydraulic brake system constructed in accordance with the present invention.

An alternative brake system is shown in FIG. 2. The front-wheel brake circuit corresponds to the brake circuit of FIG. 1. The rear-wheel brake circuit is composed of a supply valve 38 as well as a drain valve 39. Further, there is a low-pressure accumulator 44. The latter is composed of an accumulator chamber 40, a piston 42 confining the accumulator chamber 40 and a resetting spring 43. The valves 38 and 39 are driven as follows: when any one of the rear wheels tends to lock, the supply valve 38 will be closed and the drain valve 39 will be opened. This causes pressure fluid to flow out of the wheel brakes into the accumulator 40 which, in its size, is rated such as to be able to receive the total volume of pressure fluid of the brake circuit, if need be. Spring 43 is a weak resetting spring so that no essential pressure increase takes place in the intermediate accumulator 44.

The drain valve 39 is operated until the pressure in the wheel brakes is reduced so much that both wheels are free from the risk of wheel lock. The drain valve 39 switches back into its closed position, while the supply valve 38 remains energized and continues to isolate the brake line 9.

The result brought about by this very simple actuation is that the rear wheels will not lock in any case. However, adjustment of an optimal slip value is not possible.

The supply valve 38 will not open until the braking action is completed. Then the accumulator 44 can exhaust via the non-return valve 41 and the open supply valve 38 into the master brake cylinder 1 in order to be operative again upon renewed braking operation.

What is claimed:

1. An anti-lock hydraulic brake system for a vehicle having two front wheels and two rear wheels, said brake system comprising:
    a master cylinder;
    four wheel brakes, one associated with each wheel of a vehicle having two front wheels and two rear wheels;
    a first brake circuit comprising:
    (a) first fluid flow means for conducting fluid from said master cylinder to said wheel brakes associated with said two front wheels, said first fluid flow means including:
        (1) a first separating valve having:
            (i) inlet chamber to which fluid from said master cylinder is conducted, and
            (ii) first fluid control means for selectively: (1) conducting fluid from said inlet chamber of said first separating valve to said wheel brakes associated with said two front wheels, and (2) preventing fluid from leaving said inlet chamber of said first separating valve to said wheel brakes associated with said two front wheels,
        (2) a first inlet valve through which fluid from said inlet chamber of said first separating valve is selectively conducted to a first of said wheel brakes associated with said two front wheels,
        (3) a second inlet valve through which fluid from said inlet chamber of said first separating valve selectively conducted to a second of said wheel brakes associated with said two front wheels,
    (b) second fluid flow means for conducting fluid from said wheel brakes associated with said two front wheels, said second fluid flow means including:
        (1) a first outlet valve through which fluid from a first of said wheel brakes associated with said two front wheels is selectively conducted,
        (2) a second outlet valve through which fluid from a second of said wheel brakes associated with said two front wheels is selectively conducted,
        (3) a first high-pressure accumulator having:
            (i) a storage chamber to which fluid from said wheel brakes associated with said two front wheels is supplied, and
            (ii) second fluid control means responsive to the pressure of fluid supplied to said storage chamber of said first high-pressure accumulator for controlling said first fluid control means to: (1) permit fluid in said inlet chamber of said first separating valve to be conducted to said wheel brakes associated with said two front wheels when the pressure of any fluid in said storage chamber of said first high-pressure accumulator is below a predetermined level, and (2) prevent fluid in said inlet chamber of said first separating valve from being conducted to said wheel brakes associated with said two front wheels when the pressure of any fluid in said storage chamber of said first high-pressure accumulator is above said predetermined level, and
    (c) first fluid drive means for driving fluid from said wheel brakes associated with said two front wheels and passing through said first and said second outlet valves to said storage chamber of said first high-pressure accumulator;
    and a second brake circuit comprising:
    (a) third fluid flow means for conducting fluid from said master cylinder to said wheel brakes associated with said two rear wheels, said third fluid flow means including:
        (1) a second separating valve having:
            (i) inlet chamber to which fluid from said master cylinder is conducted, and
            (ii) third fluid control means for selectively: (1) conducting fluid from said inlet chamber of said second separating valve to said wheel brakes associated with said two rear wheels, and (2) preventing fluid from leaving said inlet chamber of said second separating valve to said wheel brakes associated with said two rear wheels,
    (b) a third inlet valve through which fluid from said inlet chamber of said second separating valve is selectively conducted to said wheel brakes associated with said two rear wheels, and
    (c) fourth fluid flow means for conducting fluid from said wheel brakes associated with said two rear wheels, said fourth fluid flow means including:
        (1) a third outlet valve through which fluid from said wheel brakes associated with said two rear wheels is selectively conducted,
        (2) a second high-pressure accumulator having:
            (i) a storage chamber to which fluid from said wheel brakes associated with said two rear wheels is supplied, and
            (ii) fourth fluid control means responsive to the pressure of fluid supplied to said storage chamber of said second high-pressure accumulator for controlling said third fluid control means to: (1) permit fluid in said inlet chamber of said second separating valve to be conducted to said wheel brakes associated with said two rear wheels when the pressure of any fluid in said storage chamber of said second high-pressure accumulator is below a predetermined level, and (2) prevent fluid in said inlet chamber of said second separating valve from being conducted to said wheel brakes associated with said two rear wheels when the pressure of any fluid in said storage chamber of said second high-pressure accumulator is above said predetermined level, and (3) second fluid drive means for driving fluid from said wheel brakes associated with said two rear wheels and passing through said third outlet valve to said storage chamber of said second high-pressure accumulator.

2. An anti-lock hydraulic brake system for a vehicle having two front wheels and two rear wheels, said brake system comprising:

a master cylinder;

four wheel brakes, one associated with each wheel of a vehicle having two front wheels and two rear wheels;

a first brake circuit comprising:

(a) first fluid flow means for conducting fluid from said master cylinder to said wheel brakes associated with said two front wheels, said first fluid flow means including:

(1) a separating valve having:

(i) inlet chamber to which fluid from said master cylinder is conducted, and (ii) first fluid control means for selectively: (1) conducting fluid from said inlet camber of said separating valve to said wheel brakes associated with said two front wheels, and (2) preventing fluid from leaving said inlet chamber of said separating valve to said wheel brakes associated with said two front wheels, (2) a first inlet valve through which fluid from said inlet chamber of said separating valve is selectively conducted to a first of said wheel brakes associated with said two front wheels, (3) a second inlet valve through which fluid from said inlet chamber of said separating valve is selectively conducted to a second of said wheel brakes associated with said two front wheels, (b) second fluid flow means for conducting fluid from said wheel brakes associated with said two front wheels, said second fluid flow means including:

(1) a first outlet valve through which fluid from a first of said wheel brakes associated with said two front wheels is selectively conducted, (2) a second outlet valve through which fluid from a second of said wheel brakes associated with said two front wheels is selectively conducted, (3) a high-pressure accumulator having:

(i) a storage chamber to which fluid from said wheel brakes associated with said two front wheels is supplied, and (ii) second fluid control means responsive to the pressure of fluid supplied to said storage chamber of said high-pressure accumulator for controlling said first fluid control means to: (1) permit fluid in said inlet chamber of said separating valve to be conducted to said wheel brakes associated with said two front wheels when the pressure of any fluid in said storage chamber of said high-pressure accumulator is below a predetermined level, and (2) prevent fluid in said inlet chamber of said separating valve from being conducted to said wheel brakes associated with said two front wheels when the pressure of any fluid in said storage chamber of said high-pressure accumulator is above said predetermined level, and (c) fluid drive means for driving fluid from said wheel brakes associated with said two front wheels and passing through said first and said second outlet valves to said storage chamber of said high-pressure accumulator;

and a second brake circuit comprising:

(a) a supply valve through which fluid from said master cylinder is selectively conducted to said wheel brakes associated with said two rear wheels, (b) a low-pressure accumulator, and (c) a drain valve through which fluid from said wheel brakes associated with said two rear wheels is selectively conducted to said low-pressure accumulator.

* * * * *